Nov. 10, 1931.   H. G. KIMBER   1,831,009
RAKE
Filed Sept. 2, 1930
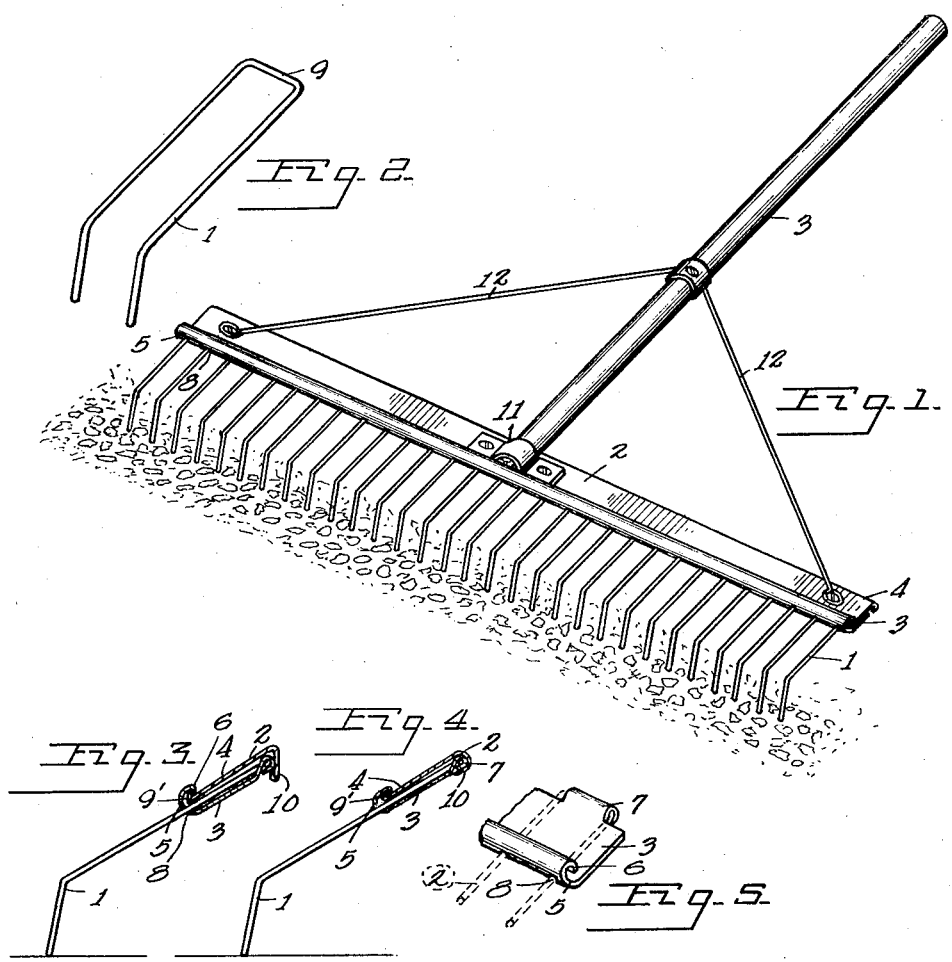
INVENTOR.
HERBERT G. KIMBER.
BY Munn & Co.
ATTORNEYS.

Patented Nov. 10, 1931

1,831,009

UNITED STATES PATENT OFFICE

HERBERT G. KIMBER, OF OAKLAND, CALIFORNIA

RAKE

Application filed September 2, 1930. Serial No. 479,357.

The present invention relates to improvements in rakes and its principal object is to provide a rake of light structure with long teeth adapted particularly for use in service stations, for raking a graveled ground surface or a lawn, and in similar situations.

The present invention is an improvement over the rakes shown in my Patents Nos. 1,514,291 and 1,532,764, and the improvement consists principally in the manner of attaching looped rake teeth or tines to a rake. More particularly it is proposed to use U-shaped rake teeth made of wire or similar material, and to provide an improved way of fastening the loop sections of these rake teeth to a common back, which latter is used for the purpose of attaching the handle thereto.

Further objects and advantages of my invention will appear as the specification proceeds.

The preferred form of my invention is illustrated in the accompanying drawings, in which Figure 1 shows my rake in perspective view;

Figure 2 a perspective detail view of a U-shaped rake tooth used in my device;

Figure 3 a longitudinal section illustrating the manner of fastening the rake teeth to the back;

Figure 4 a similar section showing the operation completed;

Figure 5 a perspective detail view of a fragment of a holding plate forming part of the back, and Figure 6 a plan view of the rake, the handle portion being omitted and parts being shown in section.

While I have shown only the preferred form of the invention, I wish to have it understood that various changes or modifications may be made within the scope of the claims hereto attached without departing from the spirit of the invention.

In its preferred form my invention comprises a plurality of U-shaped rake teeth 1, one of which is shown in Figure 2, the back 2 and the handle 3.

The back 2 consists principally of two elongated substantial rectangular plates 3 and 4. The plate 3 is formed with a bottom flange 5 which latter is preferably curved and turned at its extreme end to form a hooked section 6. The upper edge of the plate 3 is formed with a plurality of tongues 7, and the flange 5 is provided with a plurality of perforations 8 so as to allow the rake teeth to be passed through the perforations in such a manner that the loop 9 of each rake tooth catches behind one of the tongues 7 and allows the latter to be bent or folded thereover for holding the loop in place. It will be seen that in this manner, as illustrated in Figure 5, the loop section of each rake tooth overlies the plate 3, the extreme loop being held in place by the tongue 7 and an intermediate portion by the flange 5. In this manner all the rake teeth are arranged and held to the lower plate 3 in parallel relation as shown particularly well in Figure 6.

For reinforcing the hold of the plate 3 on the rake teeth, I provide the second plate 4 which overlies the assembled loop sections, and which is formed with a lower flange 9' adapted to be telescoped into the curved flange 5 so as to catch behind the hook 6 and the upper flange 10, adapted to be telescoped over the tongues 7. Figure 3 shows the different parts in assembled relation, and after the upper plate 4 has been positioned in this manner, the upper and lower flanges are firmly pressed into interlocking relation as shown in Figure 4. It will be seen that the plate 4 not only serves to overlie the loop sections of the rake teeth and to firmly confine the same, but it also holds the tongues 7 in alignment with one another, and ties the same into a firm unit so as to prevent individual tongues from yielding or breaking. The plate 4 furthermore coacts with the blade 3 in giving rigidity and strength to the entire assembly.

The handle 3 may be fastened to the upper plate 4 in any suitable manner as for instance by having its extreme ends introduced in a socket formed by a clip 11 fastened to the center of the plate 4, while two braces 12 connecting an intermediate section of the handle 3 with the outer sections of the plate 4 serve as reinforcing elements.

It will be seen from the foregoing description that a rake made in accordance with my invention is light in structure, but at the same time extremely strong, is easily assembled and is very durable particularly in view of the fact that each tooth is held in two different places.

I claim:

1. In a rake of the character described, a plurality of U shaped teeth, a plate having a flange along one edge thereof with a plurality of perforations adapted to receive the rake teeth therein, a plurality of tongues extending from the other edge of the plate and adapted for folding around the loops of the U shaped members, and an alining member adapted to be telescoped over the tongues for reinforcing the same.

2. In a rake of the character described, a plurality of U shaped teeth, a plate having a flange along one edge thereof with a plurality of perforations adapted to receive the rake teeth therein, a plurality of tongues extending from the other edge of the plate and adapted for folding around the loops of the U shaped members, and an alining member adapted to encircle the tongues for reinforcing the same.

3. In a rake of the character described, a plurality of U shaped teeth, a plate having a flange along one edge thereof with a plurality of perforations adapted to receive the rake teeth therein, a plurality of tongues extending from the other edge of the plate and adapted for folding around the loops of the U shaped members, a second plate adapted to overlie the first plate for confining the loop sections of the teeth between the two plates, an outwardly extending flange on the second plate adapted for interlocking engagement with the first flange of the first plate and an inwardly extending flange on the second plate adapted to be clamped upon the folded tongues of the first plate for reinforcing the same.

4. In a rake of the character described, a plurality of looped tines, a pair of plates adapted to confine the loop sections of the tines therebetween, means for interlocking the loop sections with one of the plates and means for interlocking the two plates, made to allow one plate to telescope over the other.

5. In a rake of the character described, a plurality of looped tines, a plate having tongues extending from the upper edge thereof adapted to be folded over the loops of the tines, means for securing intermediate sections of the tines to the lower edge of the plate and an alining member adapted to encircle the folded tongues for reinforcing the same.

Signed at Oakland in the county of Alameda and State of California the 25th day of August A. D. 1930.

HERBERT G. KIMBER.